Dec. 12, 1950     R. W. VAN ARKEL     2,534,152

FISHHOOK

Filed Jan. 11, 1949

Inventor

Ralph W. Van Arkel

By *Clarence A. O'Brien and Harvey B. Jacobson*

Attorneys

Patented Dec. 12, 1950

2,534,152

UNITED STATES PATENT OFFICE 2,534,152

FISHHOOK

Ralph W. Van Arkel, Oskaloosa, Iowa, assignor of fifty per cent to Ralph B. Kempenaar, Oskaloosa, Iowa Application January 11, 1949, Serial No. 70,314

1 Claim. (Cl. 43—89)

This invention relates to a novel fish hook, the primary object of which is to eliminate the possibility of losing a fish once it has engaged the bait on the hook.

An important object of this invention is to provide a fish hook especially designed for catching soft-mouthed fish which have a known tendency to tear a hook out of their mouths.

Another object of this invention is to provide a fish hook of the character described whereby a plurality of fish-engaging hooks are rapidly closed about the fish the moment the bait-carrying hook is engaged by a fish.

A further object of this invention is to provide a novel sure-catch fish hook which is relatively inexpensive to manufacture, simple to assemble and operate, and efficient for carrying out its intended purposes.

A further object of this invention is to provide a fish hook comprising a frame, a bait hook slidable in said frame, elongated fish-engaging hooks pivoted to said frame intermediate their ends, means for retaining the fish-engaging hooks in spread-apart position, and means responsive to a pull on the bait hook for urging the fish-engaging hooks in a closed position.

These, together with various ancillary objects and features of the invention which will later become apparent as the following description proceeds, are attained by the device, a preferred embodiment of which has been illustrated, by way of example only, in the accompanying drawings, wherein.

Specific reference will now be made to the drawings. In the several views, in the accompanying drawings and in the following specification, similar reference characters indicate corresponding elements throughout.

Figure 4:
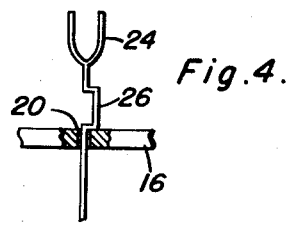
Figure 4 is a fragmentary elevational view of the bait hook illustrating the stop thereon for engaging a frame member, partially broken away.

Indicated at 10 is a frame, preferably of inverted V-shape, the top of which carries a hook 12 for engaging a fishing line 14. A transversely extending frame member 16 is provided which is secured, as at 18, adjacent the free ends of the leg portions of the frame 10. The frame member 16 is further provided centrally with an aperture 20, see Figure 4, for slidably receiving an elongated bait hook 22, the upper end of which is provided further with a fork 24. To prevent the bait hook 22 from sliding off the frame completely and for limiting the downward movement of the bait hook 22, a stop is provided between the fork 24 and the frame member 16. As shown in Figure 4, this stop is a U-shaped extension 26, but it will be readily understood that any suitable stop may be employed such as a collar and a screw extending through the collar for engaging the hook 22.

Pivoted as at 28 adjacent the ends of the frame member 16 and intermediate their ends is a pair of elongated fish-engaging hooks 30 and 32 which, at their upper ends, are provided further with inturned portions or lateral extensions 34 and 36, which are in turn apertured, as at 38 and 40, to slidably receive the leg portions of the fork 24.

Figure 1:
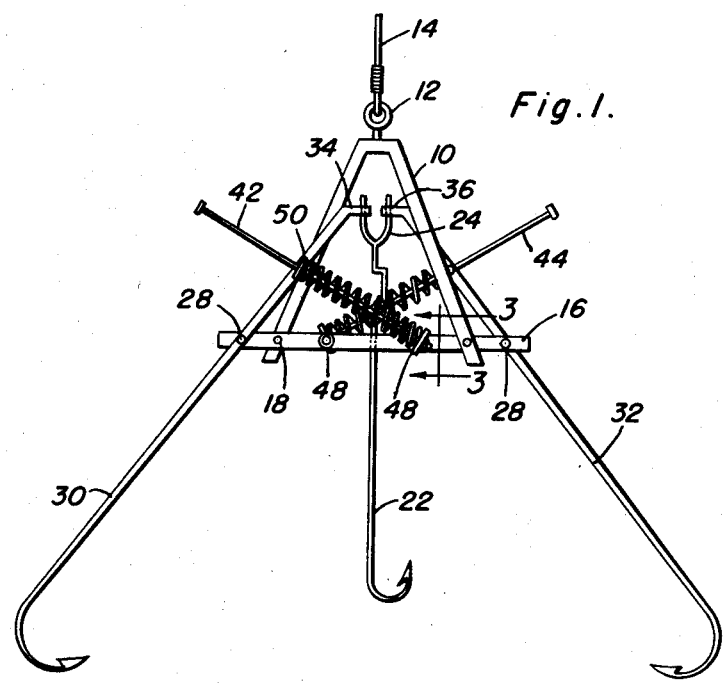
Figure 1 is a side elevational view of the device illustrating the fish-engaging hooks in an open position.
Figure 2:
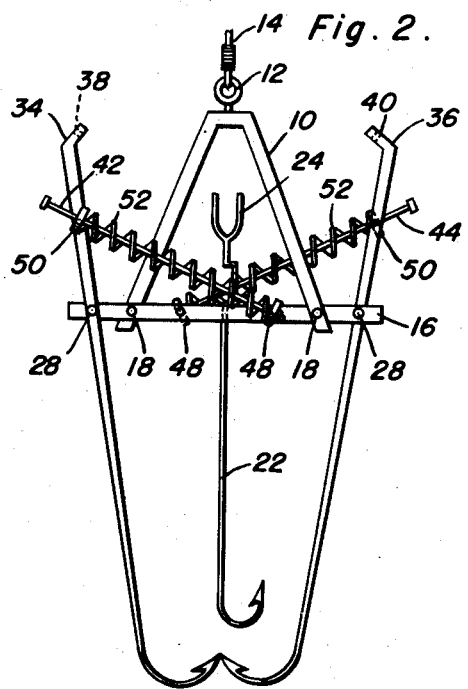
Figure 2 is a view similar to Figure 1 illustrating the fish-engaging hooks in a closed position.
Figure 3:
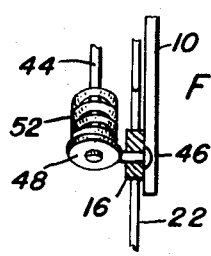
Figure 3 is a sectional view taken substantially on the plane of section line 3—3 of Figure 1.

A pair of inclined rods 42 and 44 are provided which carry the means normally urging the fish engaging hooks 30 and 32 into a closed position, as shown in Figure 2, in response to a pull on the bait hook 22. As shown clearly in Figure 3, the frame member 16 is provided with an aperture through which extends a headed nut 46 which is integral with a circular washer or stop 48 which slidably receives the lower end of each of the rods 42 and 44. Between the frame member 16 and the upper end of each fish-engaging hook 30 and 32, a washer or stop 50 is provided which is of the same construction and design as the stop 48. These stops 50 slidably receive the rods 42 and 44. Interposed between the stops 48 and 50 and about each of the rods 42 and 44 is a coil spring 52, which, as shown clearly in Figure 2, normally urges the fish-engaging hooks 30 and 32 into a closed position.

In practical operation, when a soft-mouthed fish engages the bait (not shown) retained on the bait hook 22, the hook is slid downwardly in the aperture 20 of the frame member 16. The fingers of the fork 24 become disengaged from the apertures 38 and 40, and just at this moment the springs 52 expand and urge the fish-engaging hooks 30 and 32 towards a closed position as shown in Figure 2 to be driven into the fish's mouth or on the sides thereof.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A fish hook comprising an inverted substantially V-shaped frame, means for securing the apex of said frame to a fishing line, a bar secured across and extending beyond the legs of said frame, a bait hook vertically slidable through said bar intermediate its ends, said hook including a fork at its upper end and a stop adjacent the fork to limit downward movement of the fork, elongated fish-engaging hooks pivoted intermedate their ends to the ends of said bar, said fish-engaging hooks including inturned apertured portions at their upper ends removably receiving the legs of said fork to retain the fish-engaging hooks in a spread apart position, and means responsive to a downward pull in said bait hook for urging the fish-engaging hooks in a closed position, said means including inclined rods each of which is terminally pivoted to said bar adjacent said bait hook, stops carried by said bar, stops on said fish-engaging hooks for slidably receiving said rod, and a coil spring about each rod and interposed between a pair of stops normally urging said fish-engaging hooks toward a closed position.

RALPH W. VAN ARKEL.

REFERENCES CITED

The following references are of record in the file of this patent:

UNITED STATES PATENTS

| Number | Name | Date |
|---|---|---|
| 1,217,769 | Jacobs | Feb. 27, 1917 |
| 1,382,416 | Dresser | June 21, 1921 |
| 1,624,456 | Young | Apr. 12, 1927 |
| 1,632,566 | Schneider | June 14, 1927 |